Sept. 28, 1943.                T. A. WELGER                2,330,651
                     REINFORCED DUCK AND RUBBER HOSE
                            Filed May 13, 1942

INVENTOR
Theodore A. Welger
BY Augustus B. Stoughton
ATTORNEY.

WITNESS:

Patented Sept. 28, 1943

2,330,651

UNITED STATES PATENT OFFICE 2,330,651

REINFORCED DUCK AND RUBBER HOSE

Theodore A. Welger, Trenton, N. J., assignor to Whitehead Bros. Rubber Company, Trenton, N. J., a corporation Application May 13, 1942, Serial No. 442,729

1 Claim. (Cl. 138—56)

One object of the present invention is to increase the resistance of the hose to crushing pressure thereby especially adapting it for use under suction as well as for other purposes; another object of the invention is to increase the flexibility of the hose in all directions, without increasing the weight or the costs of materials entering into the construction of the hose.

Other objects of the invention will appear from the following description at the end of which the invention will be claimed.

The invention comprises the improvements to be presently described and finally claimed.

Figure 1:
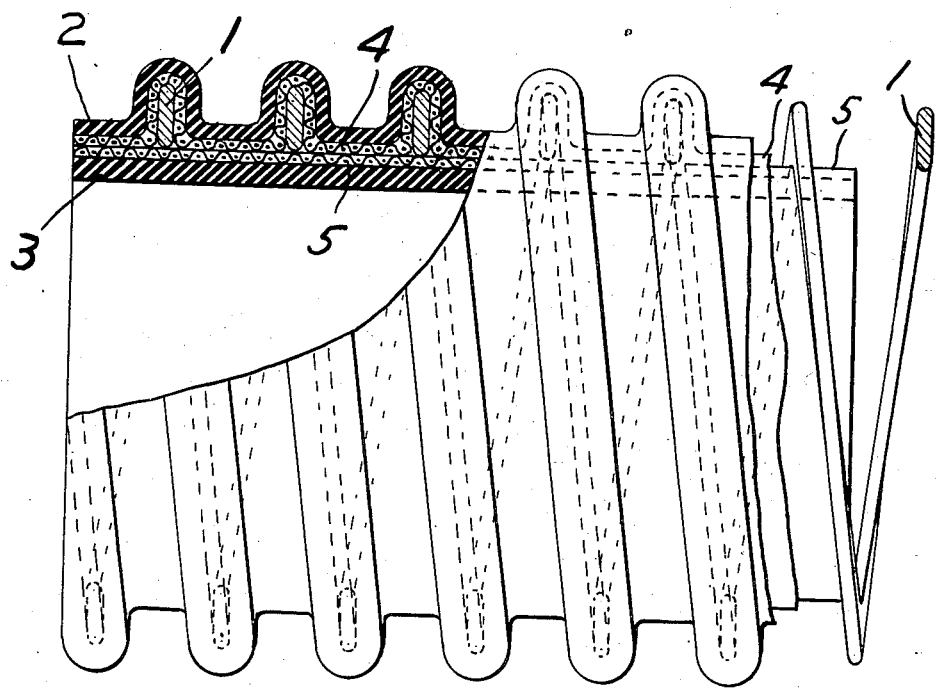
Figure 2:
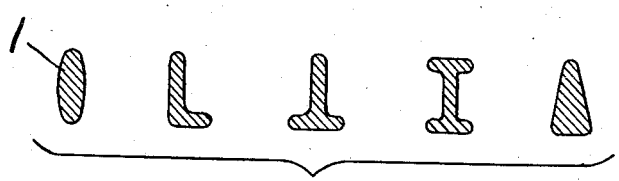

In the following description reference will be made to the accompanying drawing forming part hereof and in which, Figure 1 is a side elevation with parts broken away of a hose embodying features of the invention; and Figure 2 is a view illustrating in cross section examples of forms of winding, each section being longer than broad and, therefore, oblong.

In the drawing, 1 is a metallic reinforcement of generally oblong form, i. e., longer than broad, in cross section.

Referring to Figure 2 various forms of reinforcement, oblong in cross section, are illustrated by way of description and not by way of limitation and in each case the cross section is longer (vertically) than broad, (horizontally). From left to right the sections are oval L-shaped, inverted T-shaped, I-shaped, and triangular. The form of cross section illustrated in Figure 1 happens to be that of so called flat wire. The reinforcement is arranged finwise and spirally between layers of covering fabric 5 and reinforcing fabric 4 with the longer dimensions of its cross section disposed radially of the hose. In this way the reinforcement presents its depth to resist crushing pressure and its thickness or width to afford flexibility. The spirals or turns of the reinforcement are spaced apart. The hose comprises a cover or outer ply duck and rubber or rubber material 2 and an inner ply or rubber tube 3 with confronting layers of fabric 4 and 5 arranged between them. Externally the hose presents a spirally arranged ridge and valley appearance and internally it is of comparatively smooth bore. The effective area of the covering fabric 5 exceeds the effective area of the reinforcing fabric, and the covering fabric hugs the side portion as well as the rim portion of the reinforcement, thus providing a solid hose wall.

I claim:

For reinforcing a hose internally cylindrical and externally rib and valley in form and having inner and outer walls of rubber and duck and rubber, confronting plies of fabric differing in effective area and embedded between the inner and outer walls of the hose and continuously coextensive therewith, and a spiral winding of metal reinforcement longer than broad in cross section and arranged edgewise between and completely covered by said plies of fabric with a continuous portion of the outer ply of fabric in loop form and in contact with its rim and side faces, thereby providing a solid structure.

THEO. A. WELGER.